United States Patent
Xu et al.

(10) Patent No.: US 6,907,574 B2
(45) Date of Patent: Jun. 14, 2005

(54) SYSTEM AND METHOD OF HYPERLINK NAVIGATION BETWEEN FRAMES

(75) Inventors: Qi Xu, Santa Clara, CA (US); Mark Tom, Sunnyvale, CA (US)

(73) Assignee: ICTV, Inc., Los Gatos, CA (US)

( * ) Notice: Subject to any disclaimer, the term of this patent is extended or adjusted under 35 U.S.C. 154(b) by 575 days.

(21) Appl. No.: 09/997,608

(22) Filed: Nov. 29, 2001

(65) Prior Publication Data

US 2002/0070961 A1 Jun. 13, 2002

Related U.S. Application Data

(60) Provisional application No. 60/253,794, filed on Nov. 29, 2000.

(51) Int. Cl.[7] .................................................. G06F 3/14
(52) U.S. Cl. ...................... 715/767; 715/858; 715/862; 715/738; 715/802; 345/160; 345/157; 725/37; 725/51; 725/52
(58) Field of Search ................................ 345/767, 738, 345/739, 717, 718, 858, 859, 860, 862, 160, 157, 804, 806, 792, 802, 781, 700; 715/501.1, 700; 725/37, 38, 141, 51, 52; 348/734

(56) References Cited

U.S. PATENT DOCUMENTS

| | | | | |
|---|---|---|---|---|
| 5,990,862 A | * | 11/1999 | Lewis | ........................ 345/858 |
| 6,564,378 B1 | * | 5/2003 | Satterfield et al. | ........ 725/37 X |
| 6,657,647 B1 | * | 12/2003 | Bright | ........................ 345/856 |
| 6,717,600 B2 | * | 4/2004 | Dutta et al. | ................. 345/862 |
| 6,727,929 B1 | * | 4/2004 | Bates et al. | ................. 345/862 |
| 2003/0196174 A1 | * | 10/2003 | Pierre Cote et al. | .. 715/501.1 X |

OTHER PUBLICATIONS

"Focus Highlight for World Wide Web Frames", IBM Technical Disclosure Bulletin, vol. 40, No. 11, pp. 89–90, Nov. 1, 1997.*

* cited by examiner

*Primary Examiner*—Raymond J. Bayerl
(74) *Attorney, Agent, or Firm*—Bromberg & Sunstein LLP

(57) ABSTRACT

A system and method for navigating between hyperlinks and frames on a Web page within a Web browser in a client system in communication with one or more server systems. A plurality of hyperlinks and frames are displayed on a display of a user device via the Web browser, with each hyperlink and frame representing information about their location stored in one of the server systems. A user input entered from a remote input device is received by the client system. Based on the user input, a determination is made of which one of the hyperlinks or frames is to be marked as the active frame or link, and that hyperlink or frame is then marked. An indicator is then displayed on the display device indicating to the user that the selected hyperlink or frame has been made active.

42 Claims, 17 Drawing Sheets

SYSTEM AND METHOD OF HYPERLINK NAVIGATION BETWEEN FRAMES

PRIORITY

The present U.S. patent application claims priority from U.S. provisional patent application entitled, "System and Method of Hyperlink Navigation Between Frames" having Ser. No. 60/253,794, filed on Nov. 29, 2000, bearing Atty. Docket No. 1436/144 and which is incorporated by reference herein in its entirety.

FIELD OF THE INVENTION

The present invention pertains to the field of Web browser interfaces. More particularly, the present invention relates to a method and apparatus for navigating between hyperlinks and frames displayed on a television Web browser using a remote control or a keyboard.

BACKGROUND OF THE INVENTION

The World-Wide Web ("WWW") has become increasingly popular over the years. Web browsing on the internet is generally done with a personal computer, however, advances in technology have extended the Web browsing experience to television sets connected in some fashion to the Internet.

Standard computer Web browsers in the prior art generally do not provide the degree of user-friendliness desired by some people who lack computer experience, and many computer novices do not have the patience to learn how to use the software. Some people, for example, dislike an interface that requires them to identify hyperlink objects and use the point-and-click technique to browse through Web pages.

Most people, however, feel quite comfortable using a remote control to operate a television set. Therefore, it would be desirable to provide a means by which a person can access the World-Wide Web without the use of a personal computer. In particular, it would be desirable for a person to be able to access and navigate through Web pages using an ordinary television set and a remote control.

Various different types of television Web browsers are known in the prior art, however, prior art Web browsers do not allow for quick and easy navigation between hyperlinks set within a Web page that has more than one frame. It would therefore further be desirable to have a user interface by which a person can use a remote control or keyboard to navigate between hyperlinks and frames on a Web page with minimal effort or thought, so that a person feels more as if he or she is simply changing television channels rather than utilizing a complex computer network.

Therefore, there remains a need for an improved system and method to provide a quick and easy way of navigating between hyperlinks and frames in an interactive-television Web browser setting.

SUMMARY OF THE INVENTION

Embodiments of the present invention provide a system and method for navigating between hyperlinks and frames on a Web page within a Web browser in a client system in communication with one or more server systems. A plurality of hyperlinks and frames are displayed on a display of a user device via the Web browser, with each hyperlink and frame representing information about their location stored in one of the server systems. A user input entered from a remote input device is received by the client system. Based on the user input, a determination is made of which one of the hyperlinks or frames is to be marked as the active frame or link, and that hyperlink or frame is then marked. An indicator is then displayed on the display device indicating to the user that the selected hyperlink or frame has been made active.

A processor in the client system is equipped to determine the location within the Web browser window of each frame. The processor after receiving a directional command from the remote input device of the user, determines the frame nearest an active hyperlink based upon the directional command. The input device of the user is a non-movement translating pointing device such as a remote control or a keyboard as opposed to a mouse or a trackball. The processor then selects the nearest frame as the proximate frame. The proximate frame may be identified as the active frame through some indicia such as highlighting the frame. After the proximate frame is identified the processor may further determine the position of all links within the proximate frame. After the position of the links is determined, the processor can find the closest navigable link to the currently active link which is in the direction of the received directional command. The closest navigable link is then marked as the active link. The processor then updates the web page changing the web page so that the closest navigable link is provided with indicia indicating that it is the active link when displayed on a user's display device. The processor then sends the webpage as a signal to a remote location associated with the user for display on the user's display device. In one embodiment, the processor may be part of a cable television system which sends the web page via a two-way cable link to be displayed on a cable subscriber's television.

Determining the distance between the current active link and any other link may be achieved through different methods depending on the direction selected by the user. If the user selects a left or right directional key the processor may iteratively search to see if there is a link within a predetermined vertical increment in the left or right direction within the closest frame.

Other advantages and features of the present invention will be apparent from the drawings and detailed description as set forth below.

BRIEF DESCRIPTION OF THE DRAWINGS

FIG. 5A is a flow diagram illustrating one embodiment of the present invention in which embedded frames and empty frames are accounted for;

DETAILED DESCRIPTION

Figure 1:
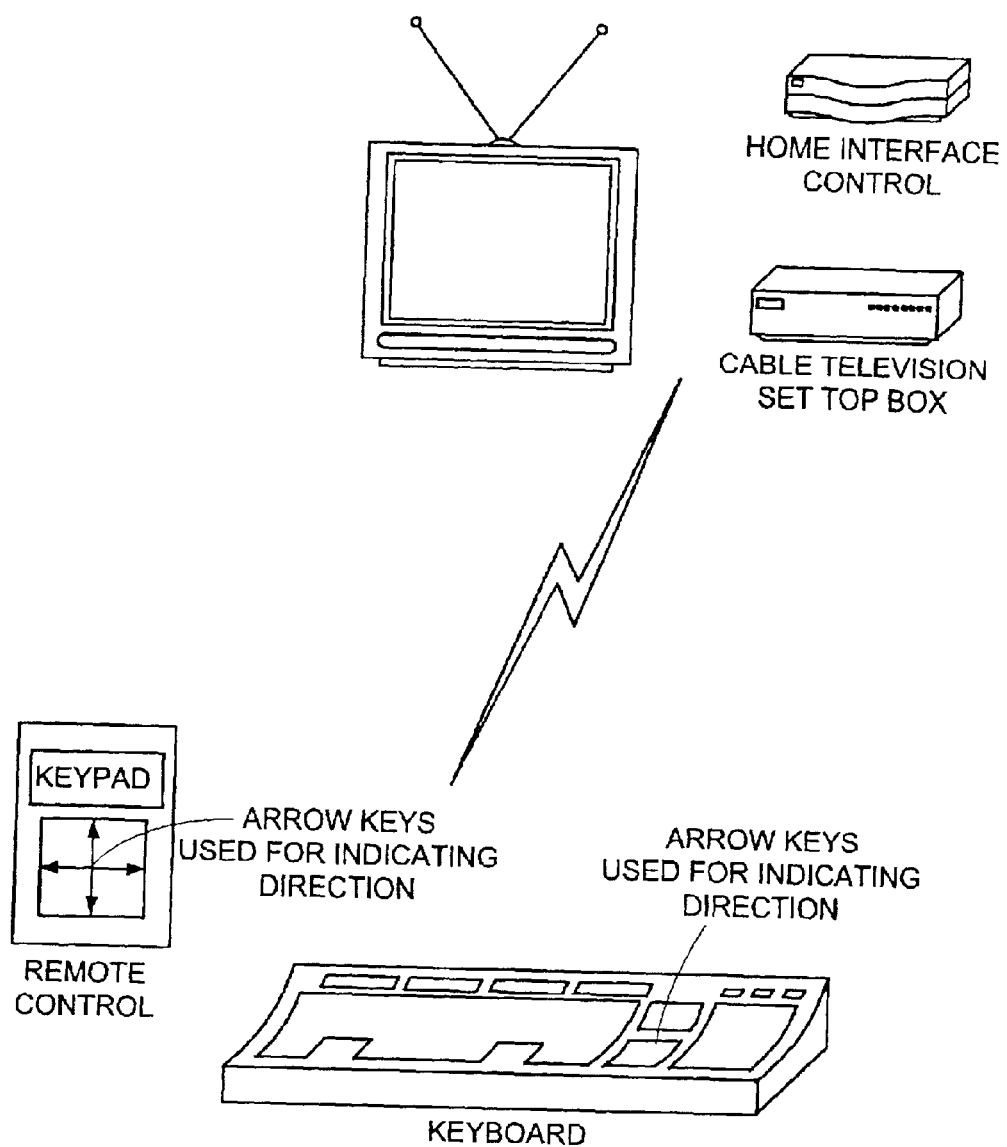
FIG. 1 illustrates an environment for implementing an embodiment of the invention for navigation of a Web page having a plurality of frames without a mouse or trackball based pointing device.

In one embodiment, the present invention relates to an improved system and method for allowing a user to navigate between a plurality of hyperlinks and frames displayed on a display device using a non-movement translating input device. In the following description, for purposes of explanation, numerous specific details are set forth in order to provide a thorough understanding of embodiments of the present invention. It will be evident, however, to one skilled in the art that the present invention may be practiced without these specific details. In one embodiment, the system and method may be implemented in an interactive cable television system, such as, that which is described below.

For the purposes of the description herein and the claims that follow it, unless the context otherwise requires, the terms "cable television environment" and "cable television system" include all integrated systems for delivery of any information service to subscribers for use in connection with their televisions. These include conventional cable television systems utilizing coaxial cable for distribution primarily of broadcast and paid television programming, cable television systems using fiber optics and mixed fiber optic-coaxial cable, as well as other means for distribution of information services to subscribers. Similarly, unless the context otherwise requires, the term "information service" includes any service capable of being furnished to a television viewer having an interface permitting (but not necessarily requiring) interaction with a facility of the cable provider, including but not limited to an interactive information service, video on demand, Internet access, local origination service, community event service, regular broadcast service, etc. "Television communication" means providing an information service via a television information signal. A "television information signal" is any signal that may be utilized by a television for video display, regardless of the form, including a standard NTSC-modulated rf carrier, an MPEG-compressed digital data stream, or any other format. "Interactive television service" means an information service that utilizes an interface affording two-way communication with a facility of the cable provider. "Interactive pages" are defined herein to include still video frame images or a multimedia short script for interpretation by a local process such as a typical page of HTML data as practiced by conventional Web browsers. Thus the interactive page may show cursor movement or flashing or revolving images under local process control. An interactive page is typically sent intermittently from a server. It does not require the server to continually send video information multiple times a second. The term "Web page" shall be defined as a displayable document in a Web browser which contains instructions at least for formatting. The term "hyperlink" shall refer to text or graphic on a Web page which when selected causes the display to change to either a different section of the Web page or to a new Web page. The term "link" as used herein shall refer to any text, graphics or hyperlinks that appear on a computer screen when a Web page is displayed. The term "active link" shall refer to a hyperlink which is currently selectable by a user. The active link includes some type of indicia indicating that it is the active link. For example, an active link may be highlighted, changed to a different color, or outlined to indicate the link's status as active. The term "location" as used herein can refer to the coordinate position of an object, such as a frame, a link, or a hyperlink unless the context indicates otherwise. The coordinate position may include one coordinate or multiple coordinates to define the location of the object relative to the web browser window.

FIG. 1 shows one environment in which the present invention may operate. A television is electrically coupled to a cable set top box of a cable television system and a home interface controller. The home interface controller provides for interactive services from the cable television system's headend. The cable subscriber may request an interactive service such as Web browsing session. In other embodiments, the functionality of the home interface controller is built into the set-top box. The request for an interactive session is made through either a remote control or a keyboard which sends signals to the set-top box. The set-top box sends the request for an interactive session to a system manager in the headend which assigns a separate processor for interactive communication with the cable subscriber's set-top box. The session processor accesses a Web application server for obtaining access to the World Wide Web. After an interactive session is established, the user may send signals regarding navigation of a selected Web page to the headend through the directional keys on the remote control or on the keyboard. An exemplary cable television system for establishing an interactive session with a cable subscriber will now be described.

A cable television system comprises a headend and distribution plant. The cable distribution plant includes a cable distribution network having bridger amplifiers, feeders, feeder amplifiers, and cable drops serving homes. FIG. 1 is an exemplary embodiment for implementing the system and method of the present invention.

Figure 1A:
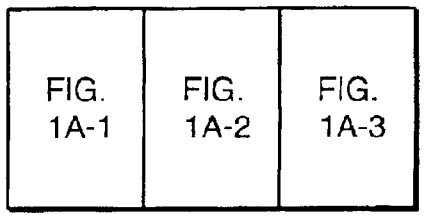
FIG. 1A illustrates a headend for providing interactive services.
Figures 1, 1A:
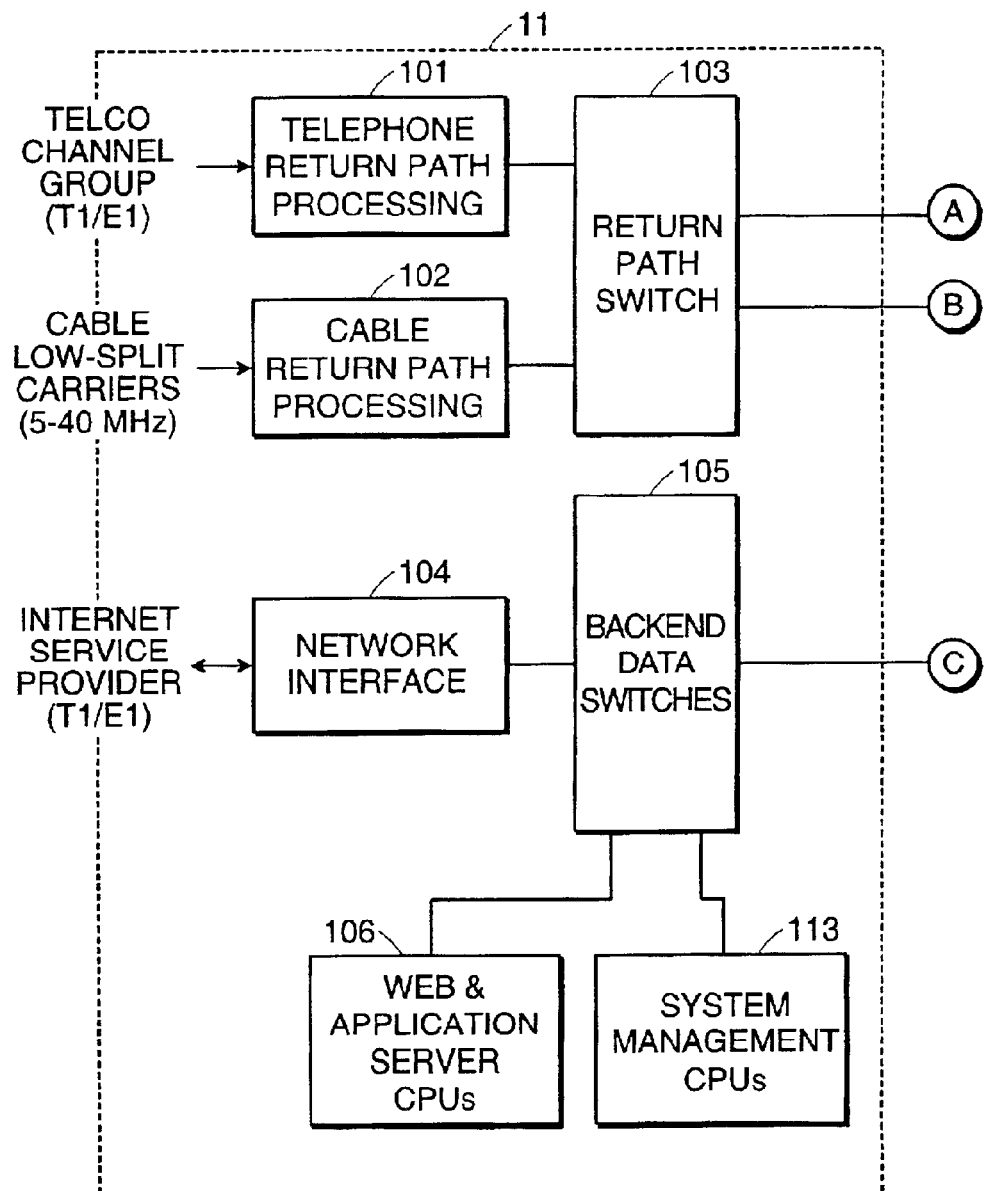

Referring now to FIG. 1A, a headend is illustrated for providing interactive services. The headend includes back end 11, front end 12, and switching output RF hub 13. Data communication from subscribers is delivered thru a return data path to the back end 11 of the headend. One alternative return path is through telephone lines to telephone return path processing block 101. Another alternative return path is through a reserved frequency band throughout the cable network. For example, the 5–40 MHz band may be reserved for data communication from subscribers to the headend. Cable return path processing block 102 is in communication with such signals provided over a cable return path. Telephone return path processing 101 and cable return path processing 102 are connected through return path switches 103 with user service cards 202 and frame server 206. The user service cards 202 each contain a processor that acts as an interactive controller which is individually assignable to a requesting subscriber on a demand basis. The interactive controller receives the data from its assigned subscriber and produces the information to be delivered to the subscriber in a television signal. The frame server 206 is a processor which runs individually assignable interactive control processes. Each interactive process on the frame server 206 responds to data from its assigned subscriber and produces the information to be delivered to the subscriber in the form of a television signal.

The back end 11 further provides information sources to the front end 12. A network interface 104 is in communication with an Internet service provider. Back end switches 105 are in communication with the network interface 104 and web and application server CPU's 106 as well as system management CPUs 113.
Communications are completed with the front end 12 through back end switches 105 via distribution switches 201. Because the user service cards in a preferred embodiment are diskless and lack ROM with stored software necessary for bootup, server 106 may also provide booting-up for the interactive controllers Also, server 106 provides a web proxy server function so that information downloaded from a remote server on the Internet is quickly cached on server 106.

Distribution switches 201 provide communication signals and control signals to the user service cards 202, the frame server 206, MPEG to video decoder cards 208 and MPEG2 pass thru 209. MPEG and MPEG2 digital encoding schemes are referred to herein by example only. Those of ordinary skill in the art should readily recognize that the present invention may be practiced with other currently available and later developed schemes for delivering video information through digital signals. The user service cards may be dedicated to any of a variety of interactive services. For example, there may be Internet service cards for running web browser processes and other video game player cards for running video game processes. The MPEG-to-video decoder cards 208 and the MPEG2 pass thru 209 are for providing video to subscribers on demand and for providing access to Web pages.

NTSC/PAL TV modulator cards 203 provide analog television signals from the outputs of the user service cards 202. The television signals are in the form of NTSC or PAL IF (intermediate frequency) signals. NTSC/PAL TV modulator cards 210 are also provided for providing video on demand on analog signals. The analog signals from the user card chassis NTSC/PAL TV modulators 203 and the video on demand NTSC/PAL TV modulators 210 are provided to initial RF processing 301 and 303, respectively, in the switching output RF hub 13. The initial RF processing includes upconverting the NTSC/PAL IF carrier signals onto a frequency determined by the channel frequency assigned to the subscriber destination. Channel assignment and control of any adjustable upconverters is handled by system management CPUs 113 which are in communication with the switching output RF hub 13 through communication lines not shown. In a presently preferred embodiment, a user service card 202, an NTSC/PAL modulator 203 and an upconverter may all be packaged in a single module. The module as a whole would be assigned to a requesting subscriber.

MPEG2 real time encoders 204 provide digital television signals from the outputs of the user service cards 202. The frame server 206 includes an MPEG encoder to provide digital television signals as well. Videos may be stored in MPEG format and may therefor use pass thru 209 to directly provide digital television signals. The digital signals are combined into a composite QAM (quadrature amplitude modulation) signal before going to initial RF processing. The digital signals are multiplexed so that many different signals may be carried on a single analog carrier. Multiplexer and QAM encoder 205 receives signals from the user chassis' MPEG2 real time encoders 204. Multiplexer and QAM encoder 207 receives signals from the frame server 206. QAM encoder 211 handles the video signals from the video on demand chassis. Within switching output RF hub 13, initial RF processing 301, 302, 303 is performed in which there is one RF module per simultaneous user. The output of RF processing 301, 302, 303 is switched for delivery to the service area of each respective subscriber destination and all signals going to a particular service area are combined via switcher-combiner 304. The combined signals for each service area pass through a final RF processing 305.

Figures 1, 1A, 2:
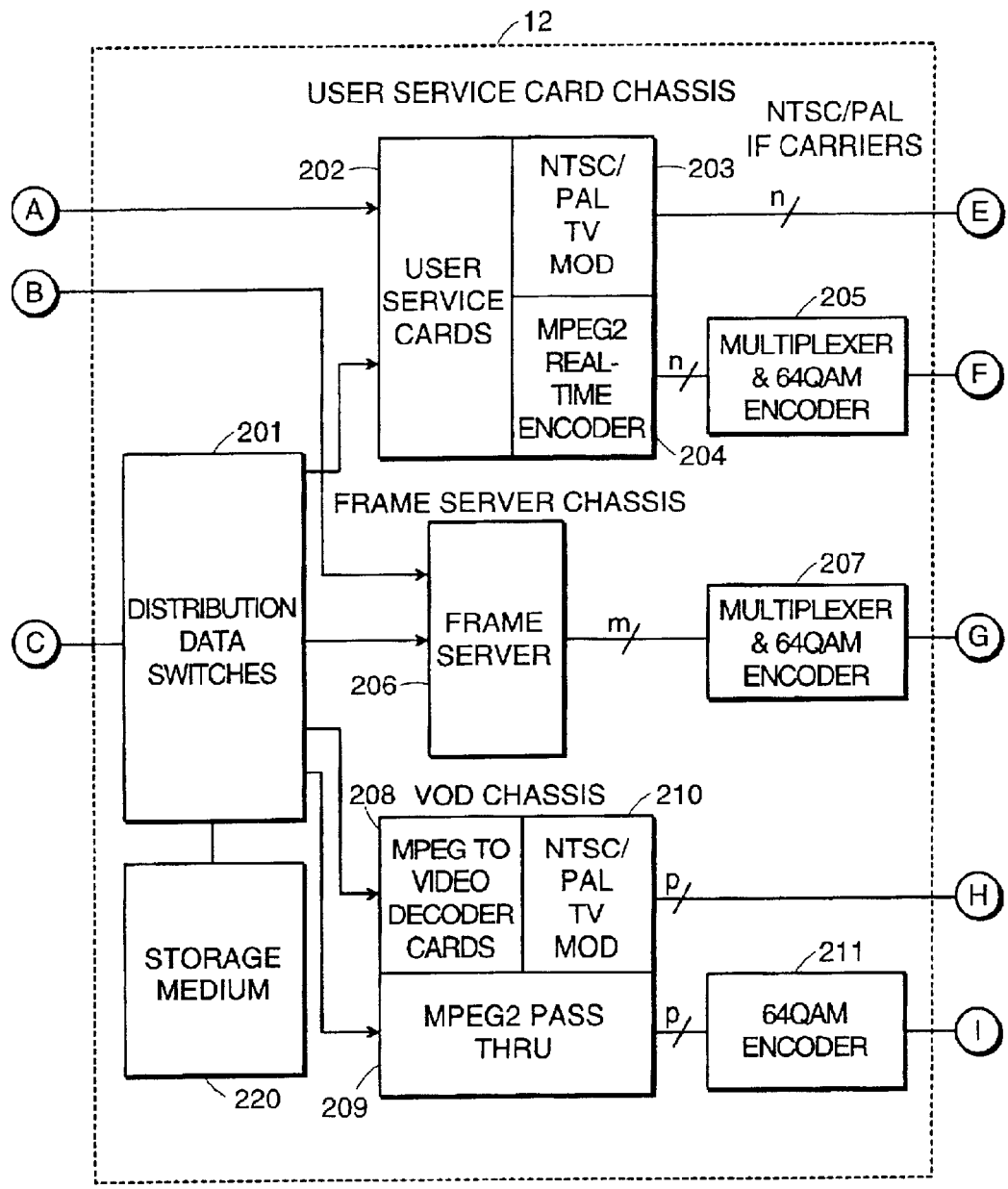
FIG. 2 is an embodiment of back end of FIG. 1 which is shown in detail.
Figures 1, 1A, 2, 3:
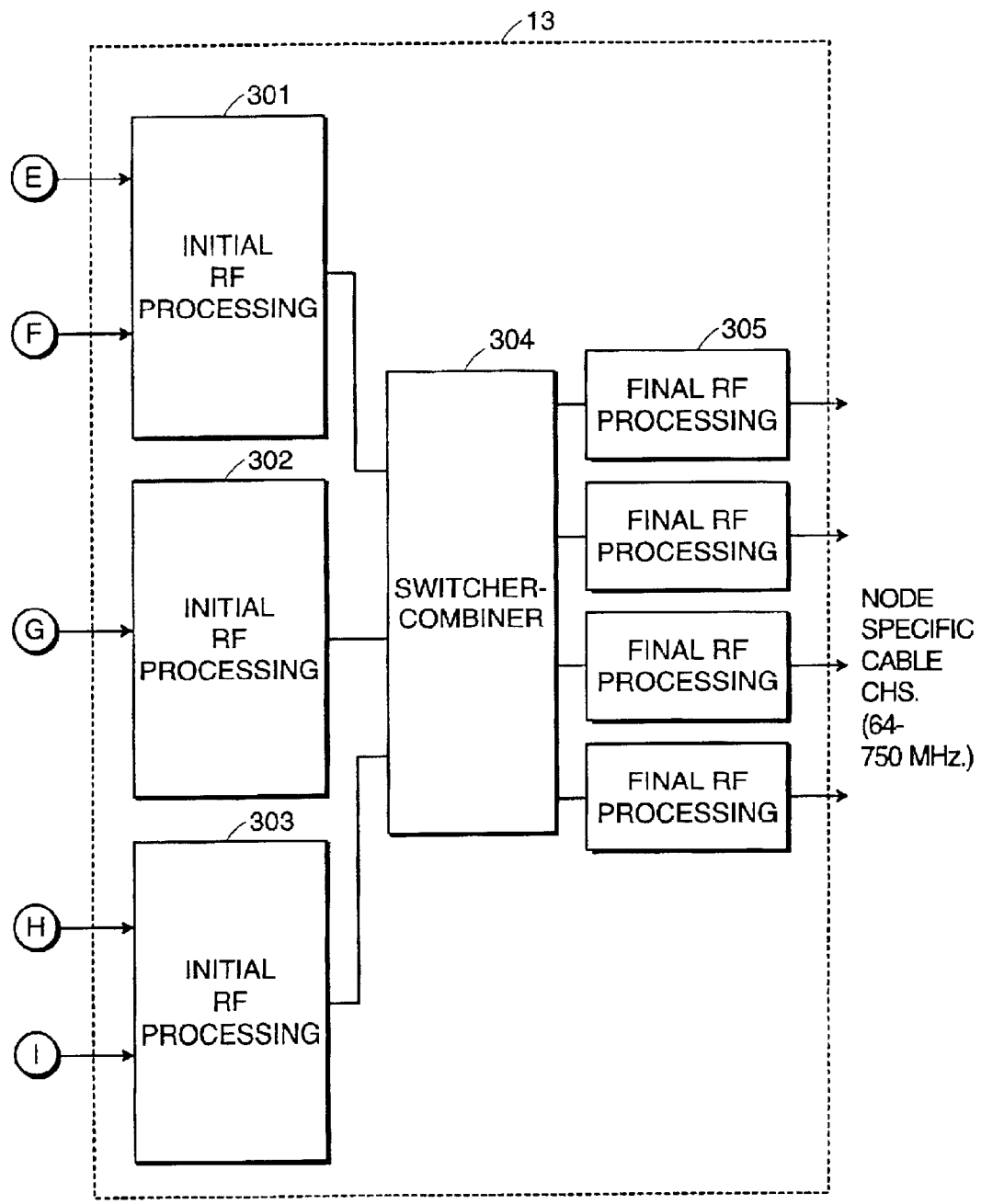
FIG. 3 illustrates a digital user service control module.
Figure 2:
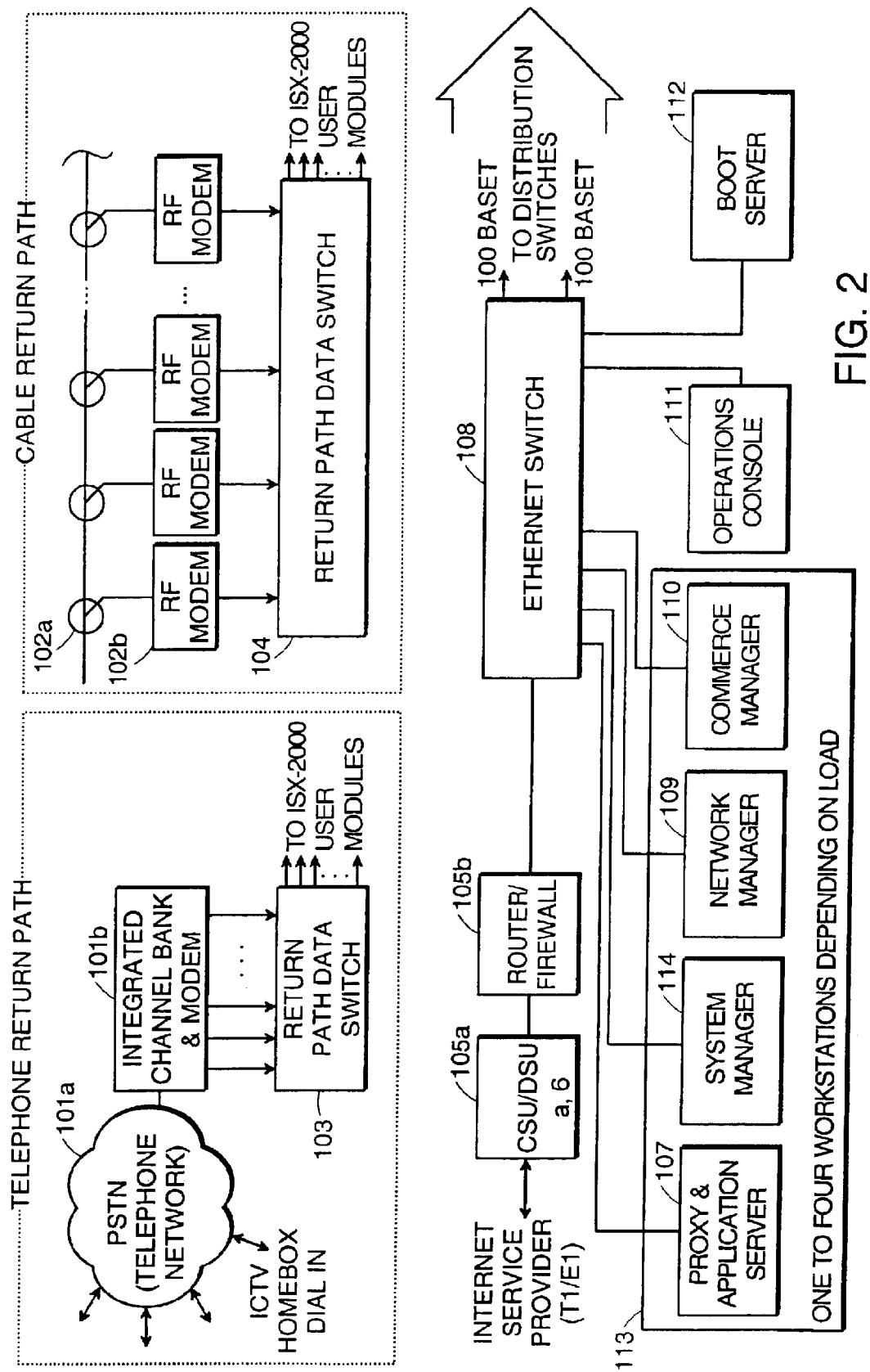
Figure 3:
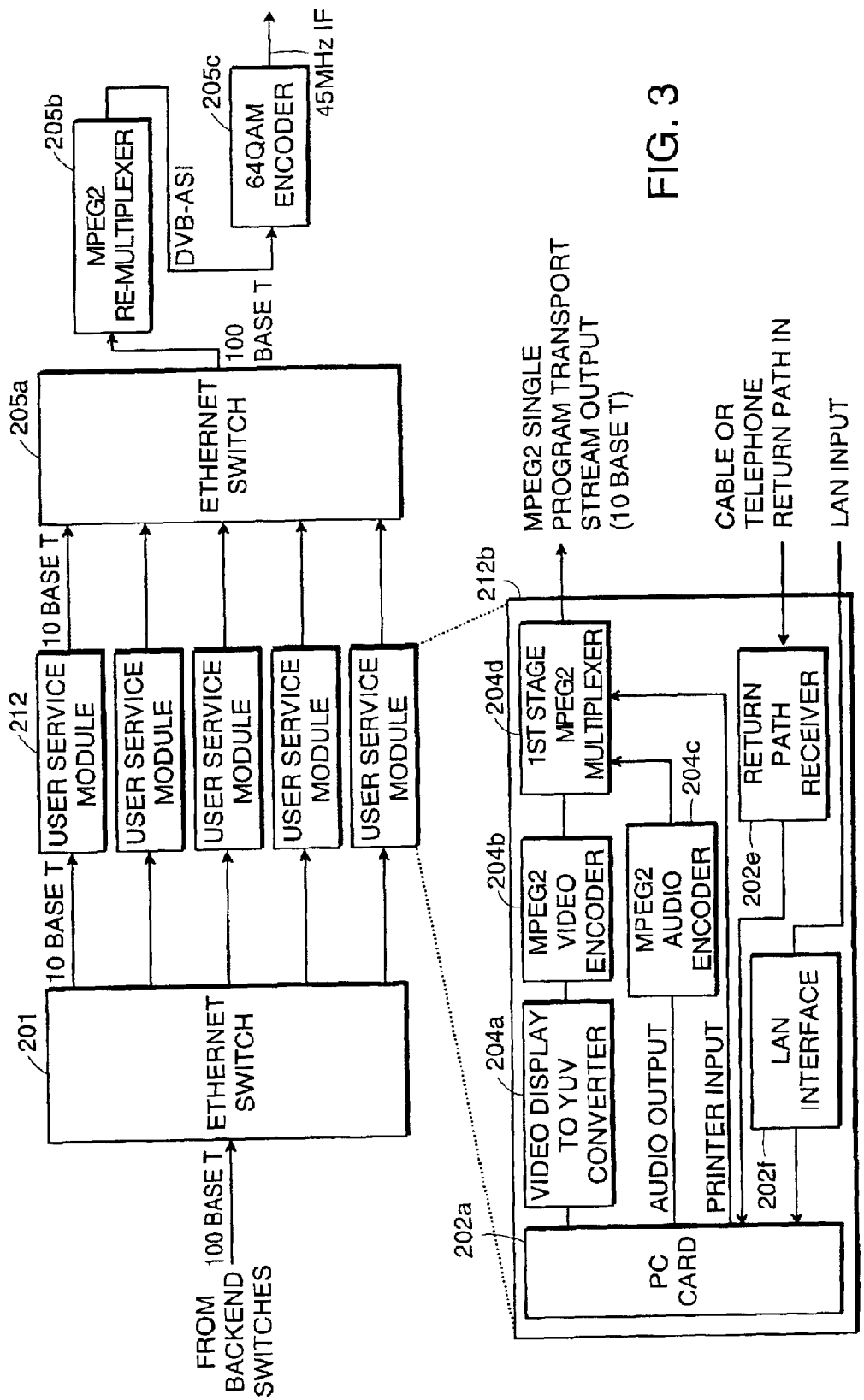

An embodiment of back end 11 is shown in more detail in FIG. 2. Cable return path processing 102 is provided by a bank of RF modems 102b. Splitters 102a extract cable signals for processing by the RF modems 102b. Telephone return path processing 101 is provided through the public service telephone network 101a to an integrated channel bank and modem 101b. Network interface 104 is provided by router firewall 105b and CSU/DSU (customer service unit/data service unit) 105a. Router firewall 105b is in communication with Ethernet switch 108. Also shown in FIG. 3 are web proxy and application server 107, system manager 114, network manager 109 and commerce manager 110 in communication with Ethernet switch 108. System manager 108 provides for the allocation of resources to permit interactive services with a user, as well as procedures for call set-up and tear down. Commerce manager 110 manages real-time transactions and converts billing to a batch format for handling by legacy systems. Also shown in FIG. 2 are operations console 111 and boot server 112 in communication with Ethernet switch 108.

An embodiment of front end 12 is shown in FIG. 3. The user service cards are preferably each housed in a single user service module 212. Ethernet switches 201 are connected to the user service modules 212.

FIG. 3 illustrates a digital user service control module 212b. In the digital control module 212b, the information signal from the PC card 202a is provided to a VGA to YUV converter 204a. The digital YUV output is encoded. The presently preferred encoder is an MPEG2 video encoder 204b and an associated MPEG2 audio encoder 204c. The encoded digital television signal is input to a first stage of an MPEG2 multiplexer 204d. To the extent the cable system is also used to handle print requests from subscribers, printer output can be sent from the PC card 202a to the first stage of the MPEG2 multiplexer. The printer output would ultimately be directed through the cable system to a settop and a printer connected to the settop. All outputs from the first stage MPEG2 multiplexers 204d are passed to the multiplexer and QAM encoder 205. This includes Ethernet Switch 205a, MPEG2 Re-Multiplexer 205b and QAM encoder 205c. The QAM encoder 205c produces a 45 MHz IF signal which can then be upconverted in initial RF processsing 301.

As will be described in greater detail below, one embodiment of the present invention includes steps for implementing a Web-browser that allows a user to navigate between hyperlinks and frames found on World-Wide Web (hereinafter "Web") pages using a remote control or a keyboard as shown in FIG. 1. The user is not required to identify or locate hyperlinks or frames; rather, the system of the present invention performs this function for the user. In the preferred embodiment, the steps of the present invention are embodied in machine-executable instructions. The instructions can be used to cause a general-purpose or special-purpose processor which is programmed with the instructions to perform the steps of the present invention. Alternatively, the steps of the present invention might be performed by specific software or hardware components that contain hardwired logic for performing the steps, or by any combination of programmed computer components and custom hardware components.

The present invention may be included in a cable television system as described or other system, that provides for browsing the Web and which connects to a conventional network, such as the Internet or similar communication lines and in which user input is not via a movement translating pointing device.

Figure 4:
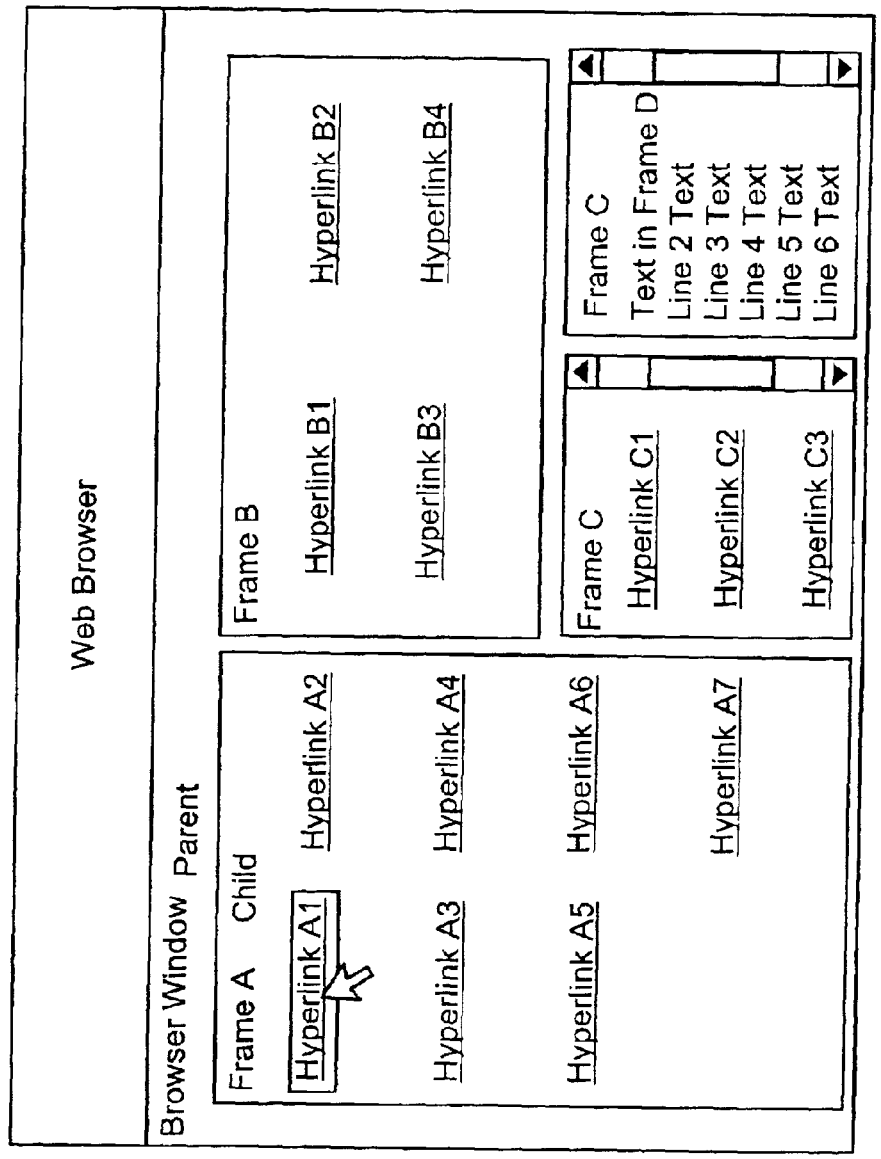
FIG. 4 is a Web browser display screen illustrating an example hyperlink and frame layout within a Web browser window.

FIG. 4 is a Web browser display screen illustrating an example hyperlink and frame layout within a Web page document. The Web-browser includes a browser window having four frames. Frame A shows seven hyperlinks; Frame B shows four hyperlinks; Frame C shows three hyperlinks; and Frame D has no hyperlinks, but only text within the frame. It should be understood by one of ordinary skill in the art that a web page is a document and that each frame is a separate document, such as, an HTML document. Frames A, B, C, and D may be considered to be embedded frames or child frames of the HTML-based document. For purposes of the following disclosure and the appended claims, a reference system for determining the location of a link will be employed wherein the coordinate system will have its origin (0,0) at the upper left hand corner of the browser window. The scale for the coordinate system may be any of a number of scales such as the pixels to be displayed across a screen. For example, in the SVGA format which has 800×600 pixels where 800 pixels denote the number of pixels across the width of the display and 600 pixels denote the number of pixels defining the height of the display.

Hyperlink A1 within Frame A is shown as being an active or highlighted hyperlink ready for selection. Additionally, Hyperlink A1 also has a pointer directly over the hyperlink. A user can select the active hyperlink to connect to that specific hyperlink. A user can also use a remote control or a keyboard, such as an IR keyboard to select a different hyperlink by pressing the appropriate Up, Down, Left or Right arrows. In FIG. 4, if the user were to select the right arrow, the closest hyperlink to the right of hyperlink A1, in this instance hyperlink A2, would be made active. Similarly, if the user were to select the down arrow, the closest hyperlink below hyperlink A1, in this instance hyperlink A3, would be made active.

A user can also use the remote control or keyboard arrows to jump between frames. In this instance, if the user selects the right arrow twice from active Hyperlink A1, Hyperlink B1 inside Frame B would then be made active by the user. Additionally, if a frame contains no hyperlinks, the entire frame can then be made active in order to allow the user to scroll within the frame, if scrolling is necessary. For example Frame D is such an example. Also in frames which contain both hyperlinks and also scrolling, the scroll bar will be considered a link and highlighted when encountered. For example, in Frame C if the right arrow key on a remote is pressed when hyperlink C1 is the active link the scrollbar would be highlighted and would then allow for scrolling through use of the up/down arrow keys.

FIGS. 5–11 are flow diagrams that illustrate embodiments of the features described above.

Figure 5:
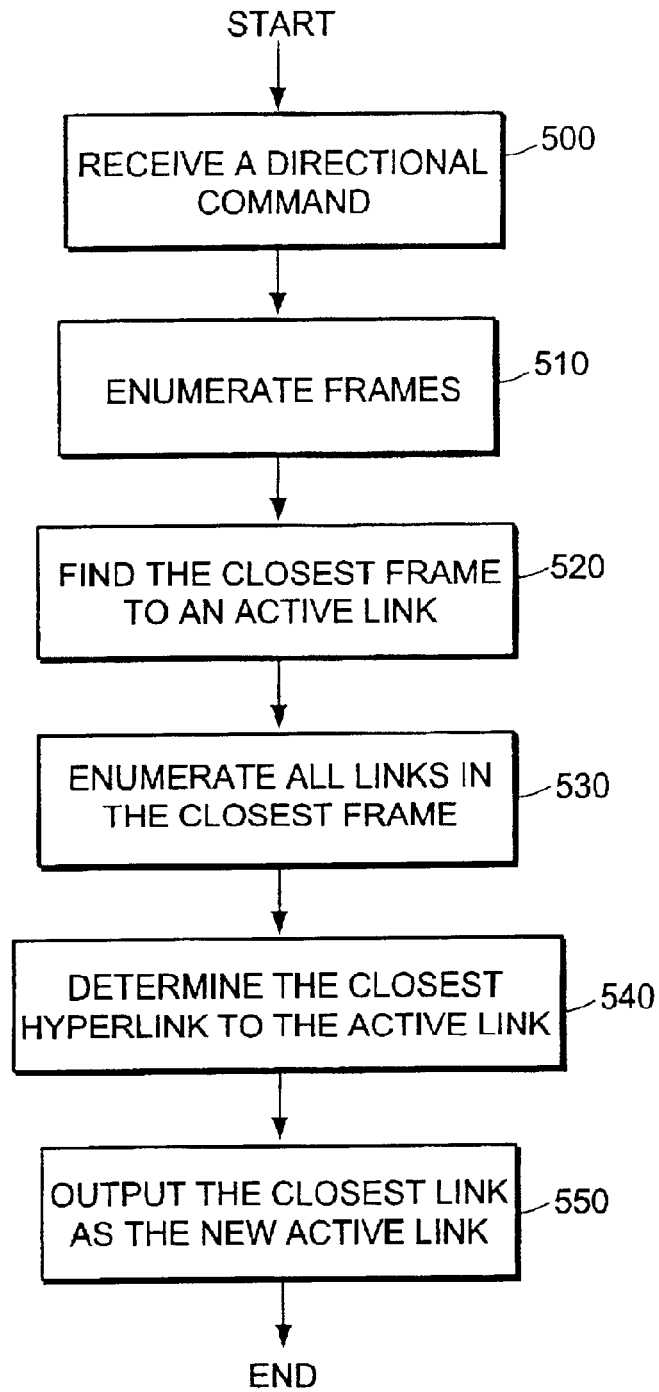
FIG. 5 is a flow diagram illustrating one embodiment of the present invention.

FIG. 5 shows a flow chart explaining the system's response to a keystroke/remote control directional selection. The system, if implemented in a cable television environment, may use the user service modules of FIG. 3 in order to perform the method. The following description will describe an embodiment of the invention in a cable television environment but is not limited to this environment. If a new Web page is selected, the system will enumerate all links within the default frame of the document. Enumeration implies associating an identifier which may be a number or variable name with the link and enumeration includes determining the coordinates of the link with respect to an origin such as the upper left hand corner of the web browser window. This information is then stored in memory associated with the system.

After the frames are enumerated, the system then identifies the hyperlink closest to the upper lefthand corner of the web browser within the default frame and marks this link as the active link. The web page is then updated to show the active link either highlighted or with a changed color. The web page is placed in the web browser which is sent to the user for display on the television associated with the user. If the system is implemented in a cable television environment, the user is a cable subscriber. In other embodiments in which the system is not implemented in a cable television network, a processor would perform all functions and send the updated web page to an associated display device such as a computer monitor.

The cable subscriber may then select a directional key and transmit a directional command to the headend which is received by a processor (Step 500). Based upon the selected direction, the processor begins to perform an iterative search routine for the hyperlink having the closest proximity to the currently active link within the default frame. If a hyperlink is found to be in the direction of the directional command signal then that link is made the active link. Locating the closest hyperlink in the direction of the directional command continues for each received directional command until there are no hyperlinks found in the requested direction within the default frame.

When no hyperlink is found in the direction of the directional command, the system begins to check for the closest hyper link in other frames. First all embedded frames are enumerated (Step 510). Enumeration for frames may include determining the coordinates of the frame such as the boundary points of the frame relative to the browser window or some other reference point and associating the frame with an identifier and storing the coordinates and the identifier in a memory location associated with a processor implementing the process.

The system then determines based upon the stored coordinate information of each frame which frame is closest to the active link (Step 520). The system next enumerates all of the links within the closest frame (Step 530).

After the links are enumerated and the coordinates and identifier of each link is stored in memory, the closest hyperlink within the closest frame to the active link is then determined (Step 540). The process of determining the closest link is an iterative process and such distance search routines are known to one of ordinary skill in the art. The distance may be determined simply by using only a single directional filter. For example, if the user selects the down arrow key, the search routine will determine the distance to all links that are simply below a certain horizontal position. In contrast, distance routines may be filtered in more than one direction, such that a region is searched. For instance, if the user selects the right arrow key on a remote control, the system may perform a search which is based upon horizontal distance within a range of vertical distances thus limiting the search to a region of the Web browser window.

Once the distances are calculated. The system must then determine if the link is a hyperlink. This process is iterative and may be performed until the closest hyperlink is found. It should be understood that there are alternative ways of determining the closest hyperlink which include reversing the order such that filtering out all non-hyperlink is performed prior to determining the distances. Other such filtering and iterative distance routines are also possible.

The system then outputs the closest frame as the active frame, highlights the active frame and sends an updated Web page to the cable subscriber (Step 550). It should be understood by one of ordinary skill in the art that the steps which are described herein may be performed in different sequences without deviating from the inventive concept. For example, all links in all the frames could be enumerated after all of the frames are enumerated. The system as preferably implemented will save and store the enumerated information about frames and links only during the receipt and processing of a single directional command signal. After processing the first directional command signal when a second directional command signal is received, the processor will again enumerate all frames and enumerate links within the frames as required. This allows for a minimal amount of memory storage and allows the system to react to dynamic web pages that change based upon a user's input. However, one of ordinary skill in the art should recognize that the information which is gathered during the enumeration process could be stored and saved and reused in order to increase the speed of execution of the process. For instance, enumerated frames and links from a webpage might be stored which would allow a user to move back and forth between frames and links on the webpage without the enumerated information having to be determined multiple times.

Figure 5A:
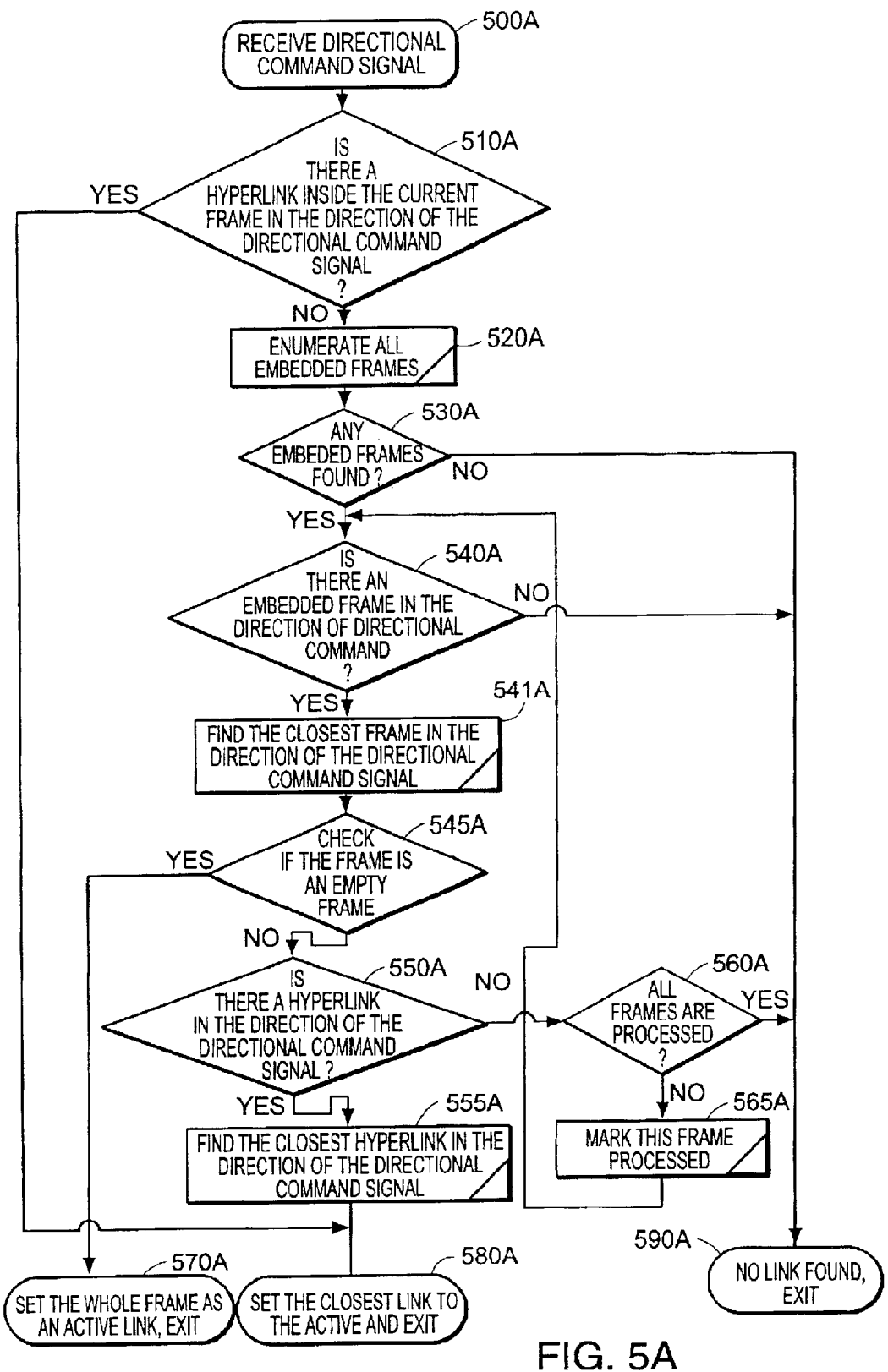

FIG. 5A is a flow chart which shows an embodiment of the present invention in which embedded frames and empty frames are accounted for. The flow chart of FIG. 5A begins after a default frame and active link have been designated. First a directional command signal is received (Step 500A). As stated previously, in the preferred embodiment the directions are either: left,right, up or down. However, it should be understood that other directions may be used, such as, directional combinations such, as upper-left, or lower-right. The process then checks to see if there is a hyperlink inside of the current frame which is in the direction of the directional command signal. (Step 510A) This can be achieved by enumerating all of the links and eliminating links that are not hyperlinks and then iteratively determining the distances of each link in the direction of the directional command until the closest hyperlink is determined.

If a link is found, the system sets this link as the active link (step 580A). If no link is found, the process enumerates all embedded frames within the parent frame/web page document (Step 520A). The embedded frames are marked with an identifier and the location of the embedded frame is determined with respect to the Web browser window.

Next, the process checks to see if any embedded frames were identified (Step 530A). If no embedded frames are found, then no link can be designated as the active link. If one or more embedded frames are found, the system determines if there is at least one frame in the direction of the directional command (Step 540A). If there are no frames then the process ends and no new link is available to be made active (Step 590A). If there is at least one frame in the direction of the direction command, the system iteratively selects a frame that is found to be in the direction of the directional command and determines the distance between the active link and the frame based upon the coordinates of the active link and the frame. The frame which is closest in distance to the active link is then selected for further processing (Step 541A).

The process continues and checks to see if the frame is an empty frame. An empty frame is a frame that does not contain any embedded frames or hyperlinks and only contains non-selectable links (Step 545A). If the frame is empty, the process sets the entire frame to be active (Step 570A). As such, a new web page is sent to the television of the system's user from the processor or in a cable network environment from a processor at the headend. The frame on the new web page that is active is graphically altered and is preferably highlighted. By marking the frame as an active frame, the frame may be selected for scrolling.

If the frame is not an empty frame, the process checks if there is at least one hyperlink within the frame in the direction of the directional command (Step 550A). If the search routine finds a link in the direction of the direction command that is selected by the user, the system will iteratively process all of the links in the direction of the direction command and determine which hyperlink is closest to the active link (Step 555A). Distances may be calculated based upon a predetermined point in a hyperlink such as the upper left hand coordinate to a predetermined point in the frame such as the central coordinate of the frame. Other locations within the link/hyperlink and the frame may also be used to measure distance.

Once the closest hyperlink is found, that link is designated as the active link (Step 580A). The processor will send a refreshed webpage to the display of the cable subscriber in which the color of the active link is changed from its original color or the active link is highlighted so that the subscriber can identify the link as the active link.

If no hyperlinks are found in the direction of the selected directional command, the process ascertains if all of the frames have been processed (Step 560A) This is achieved by reviewing the flags associated with the frames which are stored in associated memory with the processor. If all of the frames have been marked as processed, the process exits and no new link is designated as the active link (Step 590A). If all of the frames have not been processed, the current frame's flag is set to indicate that it has been processed and the process returns to step 540A (Step 565A).

It should be understood that in other embodiments once a frame is located and designated as the closest frame to the currently active link, various methodologies may be used for determining the active link within the frame. For example, after identifying that there are more than one hyperlink within the frame, the processor may select the hyperlink which has the lowest value Y coordinate (is at the upper most portion of the frame) as the active link. In such a process distance is not used to determine the closest link.

Figure 6:
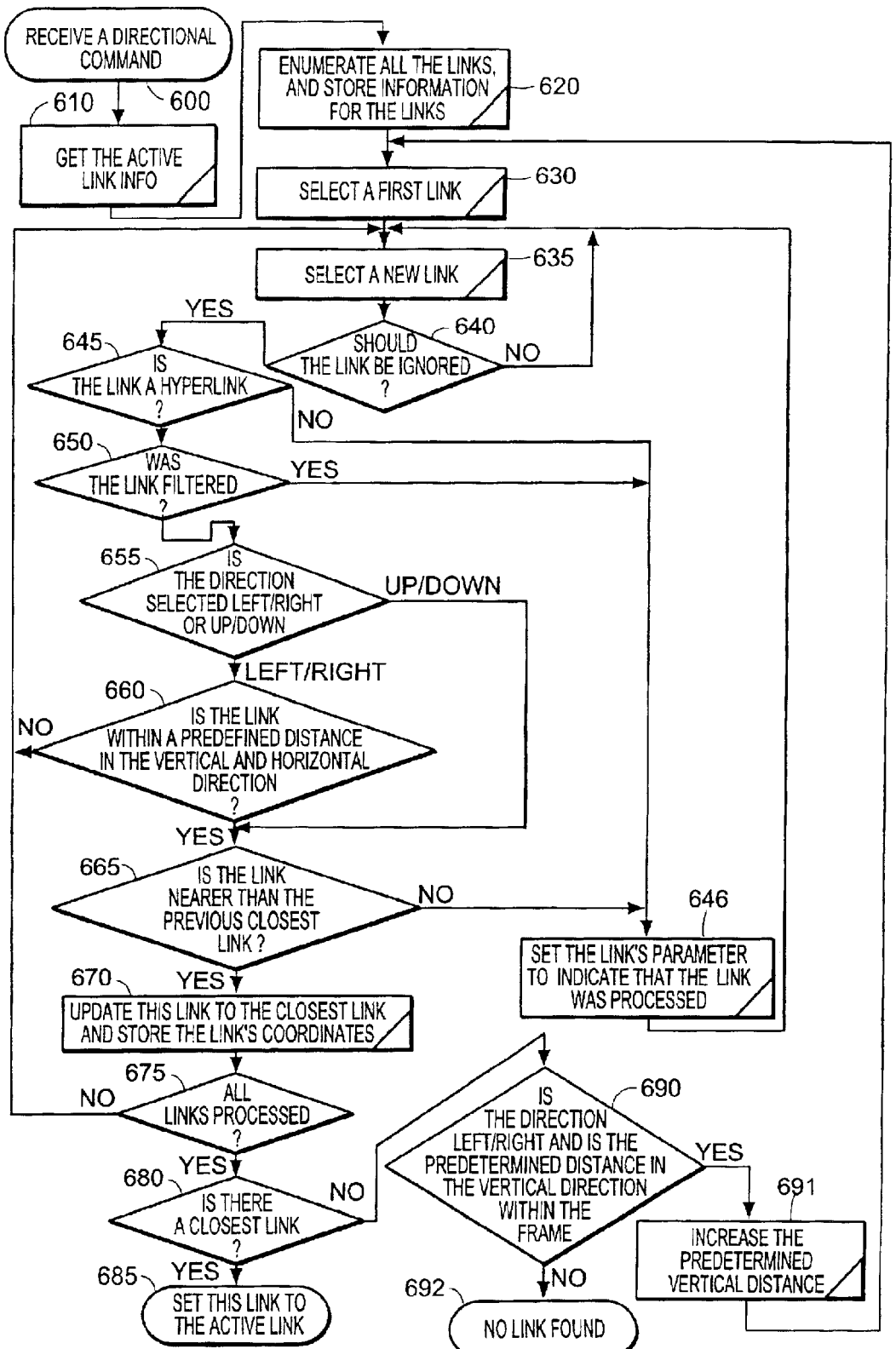
FIG. 6 is a flow diagram illustrating one embodiment of how to search for the closest link to the active link within a frame, in accordance with the present invention.

FIG. 6 is a flow chart which further explains the process which occurs in step 540 of FIG. 5 of searching for the closest link within the current frame based upon the direction selected by the cable subscriber. First an assigned processor receives a signal which is indicative of either an up,down,left, or right selection by the cable subscriber (Step 600). The processor recalls from memory the location of the currently active link (Step 610). Next all of the links are enumerated including both hyperlinks, graphic links, and text-based links (Step 620). The enumeration process includes both assigning a numeric designation to the link as well as obtaining the coordinates of the link. This process is achieved by techniques known to those of ordinary skill in the art. The system then sets variables or flags indicating that the links are to be processed and not ignored when evaluating the proximity of the link to the currently active link and also stores the coordinate values of the frame. It should be understood that the process of enumerating the links may occur at a time prior to that shown in FIG. 6.

Starting from the first link/active link (Step 630), a link is selected for distance comparision (Step 635). All links are then filtered iteratively. The system first checks to see the status of the variable indicating whether the link should be ignored or not (Step 640). If the variable/flag indicates that the link is not to be ignored the system proceeds to identify if the link is navigable ie a hyperlink (Step 645). If the link is not a hyperlink, it is eliminated and a flag is set for the link so it is not processed further in determining the proximity of the link to the currently active link (Step 646). Next, based upon the selected direction, the remaining hyperlinks are filtered to eliminate links based upon either their horizontal or vertical coordinates (Step 650). For example, if the cable user selects 'right' all hyperlinks which have an X coordinate which is to the left of the active link are eliminated from processing. It should be understood that other similar filters may be used to eliminate other hyperlinks based upon position. It should also be understood that the filtering process may be performed on all hyperlinks rather than on a link by link basis as illustrated in FIG. 6.

The process then checks to see if the user selected direction is right/left (Step 655). If the user selection is a left or right selection the processor then looks to see if the hyperlink is within a predetermined region of the browser window to the left or right within a vertical range (Step 660). If the direction is not a left/right selection, the process moves to step 665. If the hyperlink is within the stipulated range, the hyperlink is set as the closest link and the processor remembers the position of this link. The position of the current link is then compared to that of the presently active link wherein a distance between the links is determined. The distance is then compared to the hyperlink having the previous closest distance (Step 665).

If the hyperlink is not closer than the previous closest hyperlink, the system moves to step 646 and a flag is set indicating that the hyperlink should be ignored. The process then loops back to step 635. If the hyperlink is nearer than the previous closest hyperlink the system update the memory location associated with the closest hyperlink with the current hyperlink's coordinates and identifier (Step 670). The system then checks to see if all of the hyperlink have been processed (Step 675). If this is true, the system checks to see if there is a closest link (Step 680). If so, then the closet link becomes the active link (Step 685). If this is not true, the system checks that the search is not outside of the frame coordinates and confirms that a left or right key was depressed by the cable subscriber (Step 690). The searching range in the vertical direction is then incrementally increased (Step 691). If the hyperlink is not nearer than the previous hyperlink the system sets the hyperlink's flag to indicate that the hyperlink should be ignored and then proceeds back to step 635. If the boundaries of the frame are exceed or the direction selected is up or down the system returns a false value indicating that no link was found (Step 692).

Figure 7:
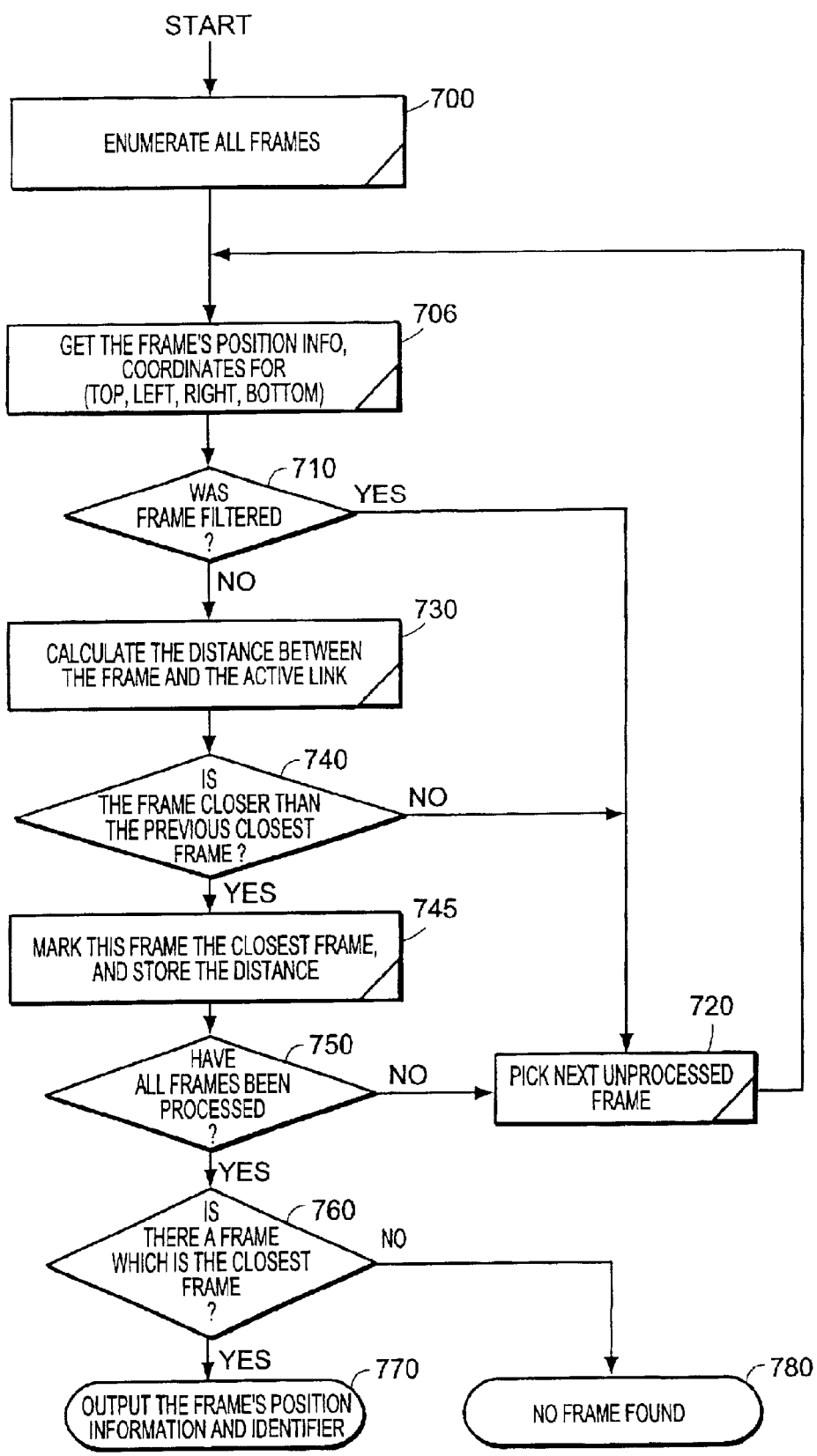
FIG. 7 is a flow diagram illustrating one embodiment of how to select the nearest frame, according to the present invention.

FIG. 7 is a flow chart showing the steps in one embodiment of the invention for searching for the nearest frame as is shown in FIG. 5 step 520. First all frames are enumerated and their position relative to the coordinate system are determined (Step 700).

Using an operating system and web browser such as the Windows operating system and the Internet Explorer Web browser which are the products of the Microsoft Corporation of Redmond, Washington which support embedded objects in a component document, frames within a component document such as web page can be identified and the position of the frames determined within the container/Web browser. The Windows operating system and Internet Explorer Web browser are enabled with the OLE (Object Linking and Embedding) programmatic interface of the Microsoft Corporation. Other operating systems which provide such functionality are made by Apple Computer and IBM. It should be understood by one of ordinary skill in the art that frames within a Web browser window are objects.

In order to enumerate the frames, the frames must be identified within the Web page document. An interface point for the web browser container is accessed. Using the access point, a program function call is made to enumerate the objects within the Web browser. Once the objects are identified, further program function calls are made to locate the position of the object within the Web browser. Function calls are made to retrieve the top position of the frame/object relative to the browser window, the left position relative to the browser window, and the height and the width of the object relative to the browser window. By accessing this information the center of the frame, can be determined which can then be used in locating the closest frame to the active link.

After the frames are enumerated, a first frame is picked for comparison with the current active frame. The frame's position information is retrieved (Step 705). The frame is then filtered (Step 710). If the frame is not a possible frame for selection, for example, the frame is located to the right of the active link when a cable user has selected a left directional key, the method loops back and another frame is selected (Step 720). If the frame is a possible frame, the distance is calculated between the frame and the currently active link (Step 730). In one embodiment, the distance is calculated from the middle point of the currently active link to the middle point of the present frame. If this is the first frame, the distance is stored into a location such that the frame becomes the closest frame. If this is the second or greater frame, once the distance is calculated it is compared to the previously stored distance of the closest frame (Step 740). If the distance is greater than closest frame's distance from the currently active link the process continues without changing the data stored regarding the position of the closest frame. If the distance from the present frame is less than that of the closest frame, the present frame becomes the closest frame and the frame's information is stored in memory associated with the closest frame (Step 745). The processor then checks to see if all frames are processed (Step 750). If this is true and there is a frame which is designated as the closet frame (Step 760) the processor outputs that frame's identifies as the closest frame (Step 770). Once the frame is determined step 530 of FIG. 5 begins. If all frames have not been processed then the system first selects the next unprocessed frame (Step 720) and returns to step 705. If there are no frames which are found to be in the direction selected by the cable subscriber, the processor returns a false value and the process ends (Step 780).

Figure 7A:
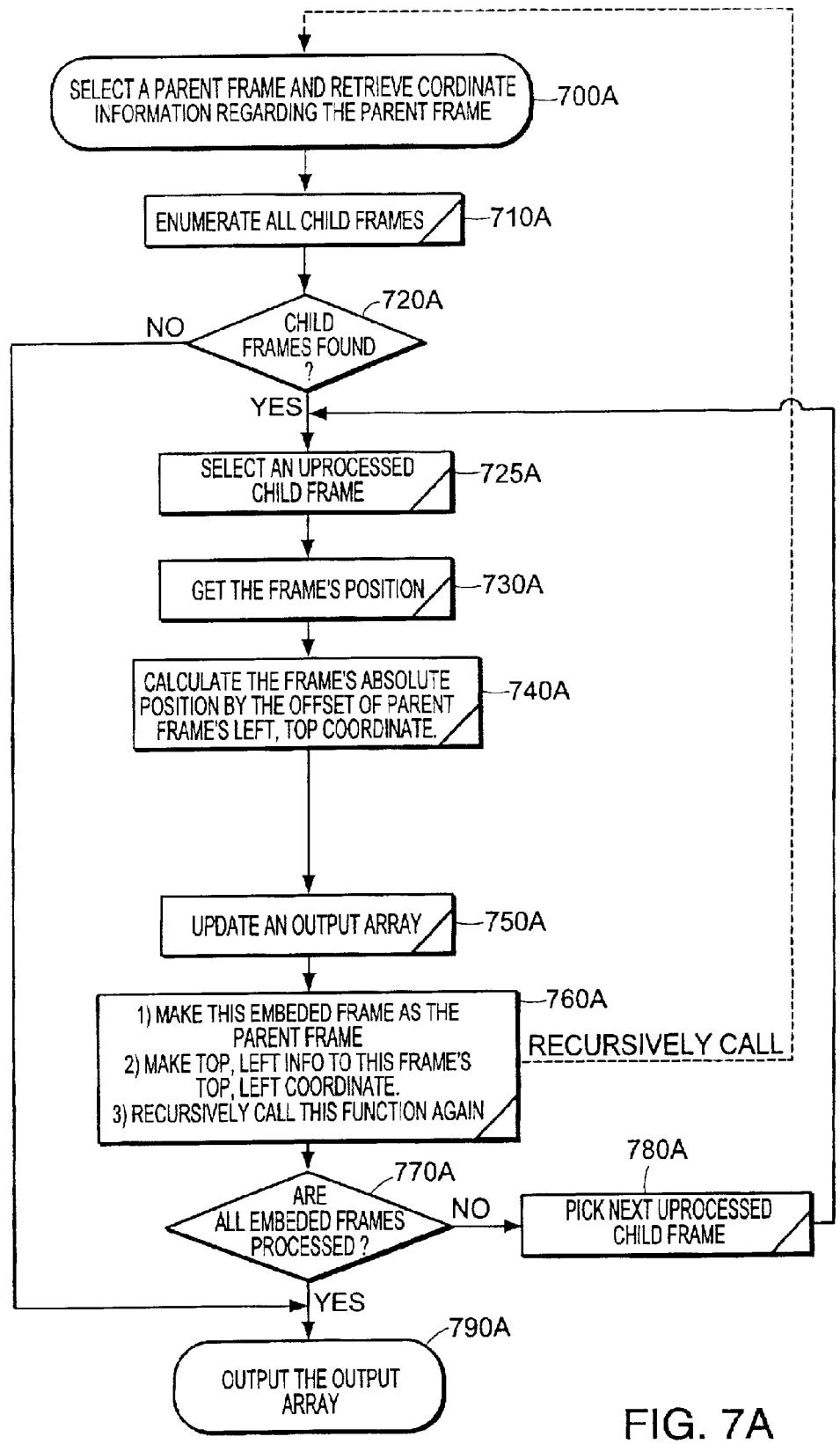
FIG. 7A is a flow diagram illustrating how to enumerate frames on a web page.
Figure 7B:
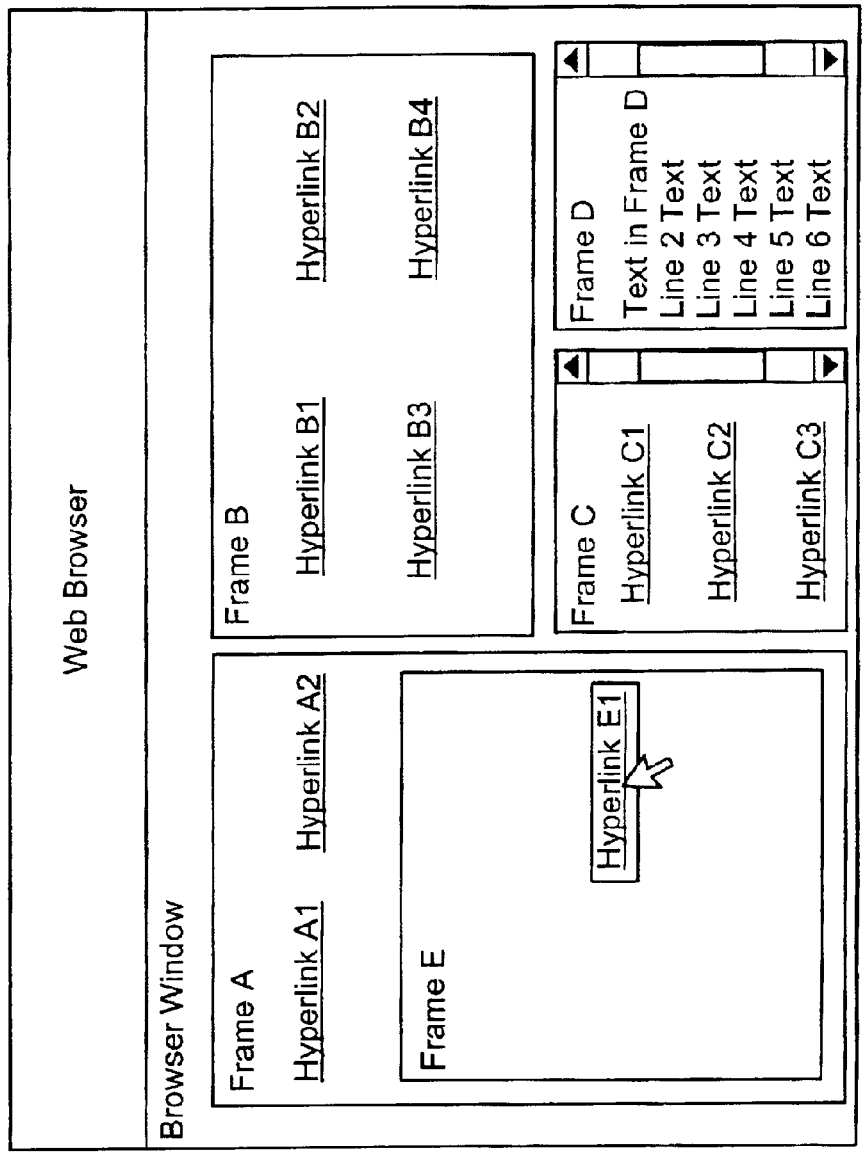
FIG. 7B illustrates a parent frame and a child frame.

The process of frame enumeration of parent/child frames in which three are frames within frames is shown in one embodiment in the flow chart of FIG. 7A. This process may be incorporated into step 510 of FIG. 5. First an array is created to hold output data including the location of all found child frames and a parent frame is selected and the enumerated information is retrieved (Step 700A). The child frames are then located by creating an access point within the container/web browser and the frame/object is accessed wherein all objects within the frame object are located (Step 710A). This is accomplished as described above with respect to step 710 of FIG. 7. The system inquires whether any child frames have been located (Step 720A). If the answer is no the process stops (Step 790A). If there are child frames, the system checks to see if the next child frame has been processed (Step 725A). If the frame has not been processed, the position of the child frame is determined which is relative to the parent frame (Step 730A). For example frame E is a child frame of frame A in FIG. 7B. The position of frame E is determined relative to the upper left hand corner of frame A (parent frame) as opposed to the absolute position on the web page which is the upper left hand corner of the Web browser window. The absolute position of the child frame is then determined using the position information of the parent frame (Step 740A). A counter is incremented and the output array is updated with the absolute position information for the child frame (Step 750A). The process then has a recursive call to itself to check to see if the child frame has child frames (Step 760A). Once all child frames of a parent frame are enumerated and their information is added to the output array, the system checks to see if all of the frames (parent frames having child frames) are processed (Step 770A). If all frames are processed, the output array is returned (Step 790A). If not, the next frame having a child frame is processed (Step 780A) and the process returns to step 725A.

Figure 8:
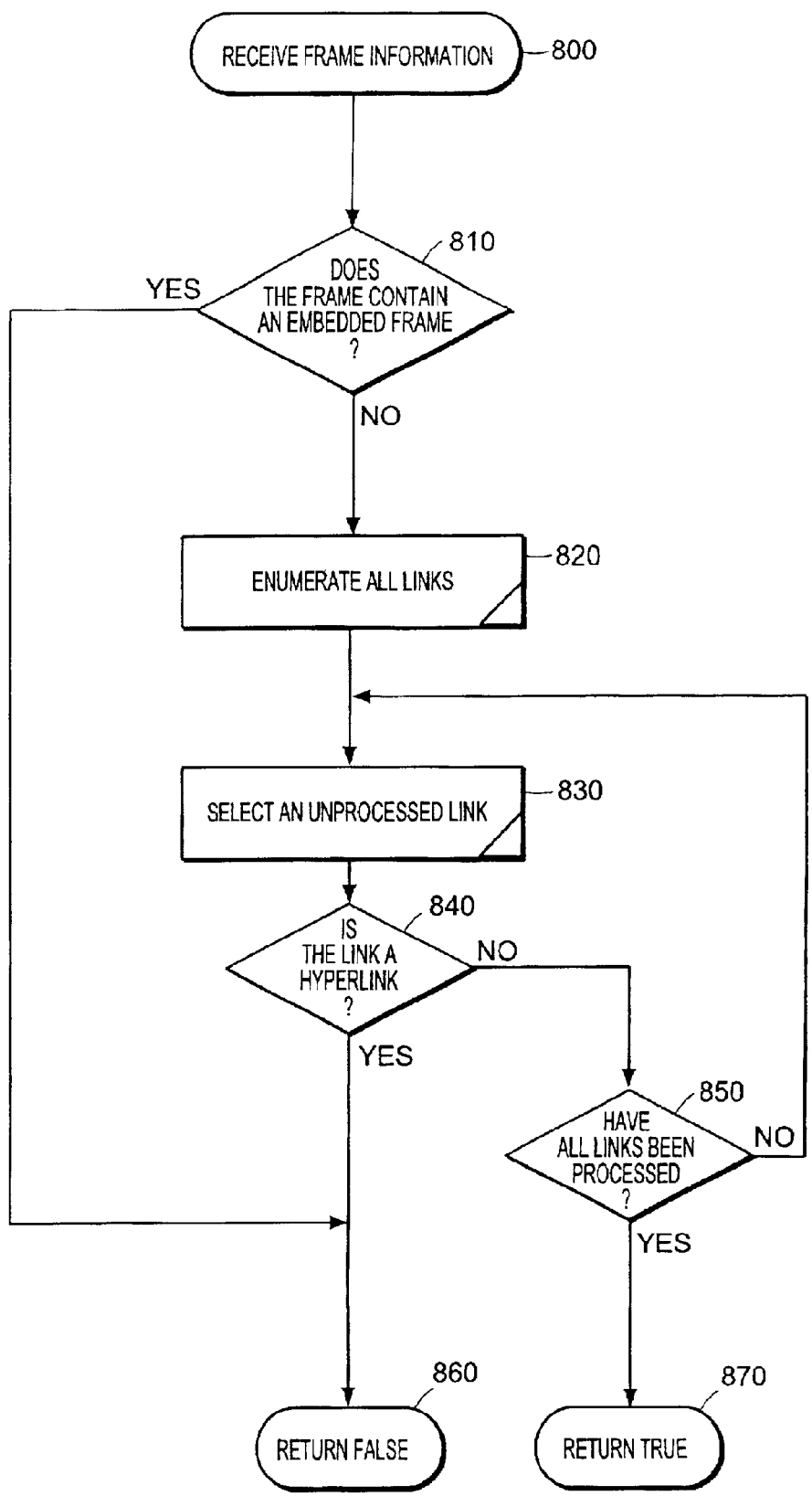
FIG. 8 is a flow diagram illustrating how to check for an empty frame within a Web page, in accordance with the present invention.

FIG. 8 is a flow chart which elaborates on the process for determining if a frame is an empty frame as in step 545A of FIG. 5A. The process retrieves the current frame information (Step 800). Based upon the retrieved frame information which includes the frame coordinates, the process check to see if there are any embedded frames within the frame such that there is a parent/child frame relationship. This is achieved by enumerating the objects within the parent frame which will identify any child frames. If a child frame is identified the system proceeds and returns a false value indicating that the frame is not empty (Step 860). If no child frames are found the process proceeds and enumerates all links within the frame(Step 820). A link within the frame which is not processed is selected (Step 830). The system then checks to see if the link is a hyperlink (Step 840). If it is a hyperlink, the process stops and returns a false value indicating that the frame is not an empty frame (Step 860). If the link is not a hyperlink the system checks to see if all links have been processed (Step 850). If the answer is yes, the frame is an empty frame (Step 870). If the answer is no, the system continues and picks another unprocessed link. The system includes a memory location for storing both frame and link information. Further, the link information includes a flag which indicates whether the link has been processed or not.

Figure 9:
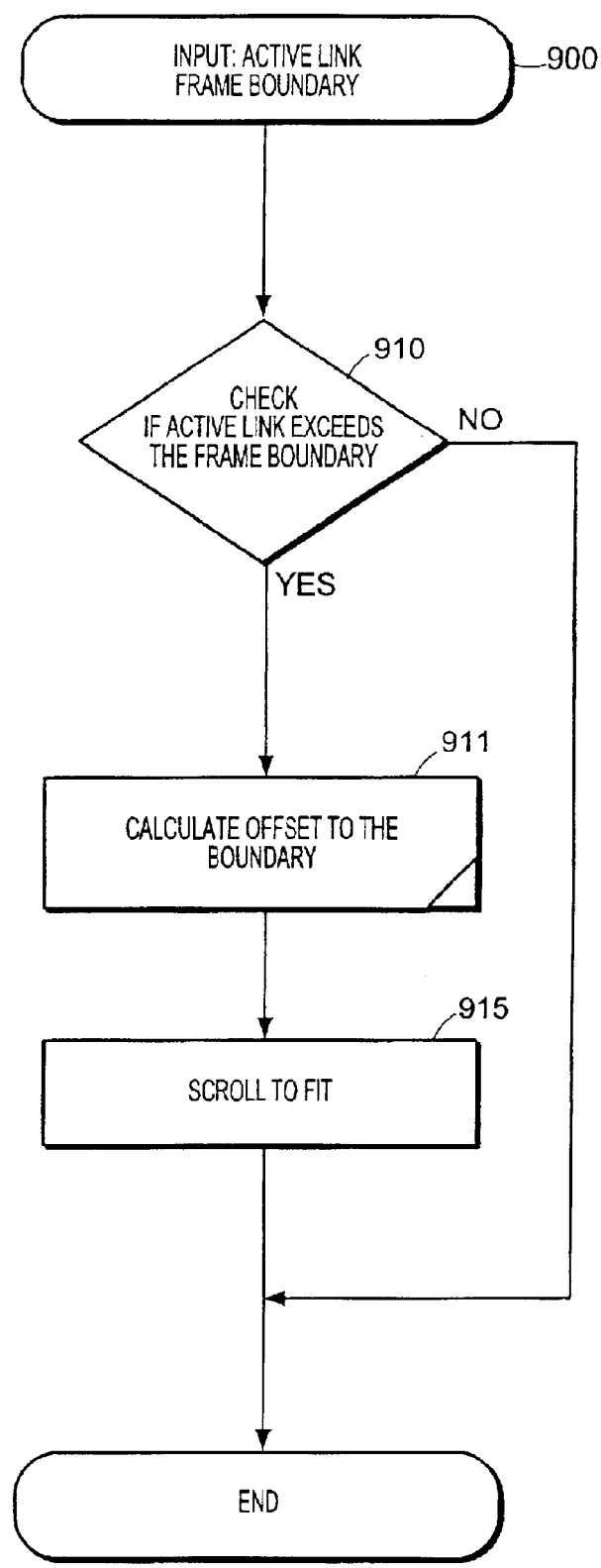
FIG. 9 is a flow diagram illustrating one embodiment of an auto-fit feature of the present invention.

The flow chart of FIG. 9 explains the process of autofitting. Autofitting causes the screen to scroll so that the active link is visible to the cable television subscriber. The system retrieves the frame information including the frame boundary coordinates of the frame which is associated with the active link (Step 900). The frame boundary coordinates are the coordinates which define what will be displayed in the web browser window. The system then checks to see if the active link exceeds the frame boundary coordinates (Step 910). If it does not, the process ends and the active link is displayed within the web browser window (Step 920). If the coordinates are exceeded, the system calculates the amount of offset (Step 911) and causes the Web browser to scroll so that the active link is displayed (Step 915). In one embodiment the active link is centered within the web browser window. It should be understood by one of ordinary skill in the art that the act of scrolling can be readily controlled.

Figure 10:
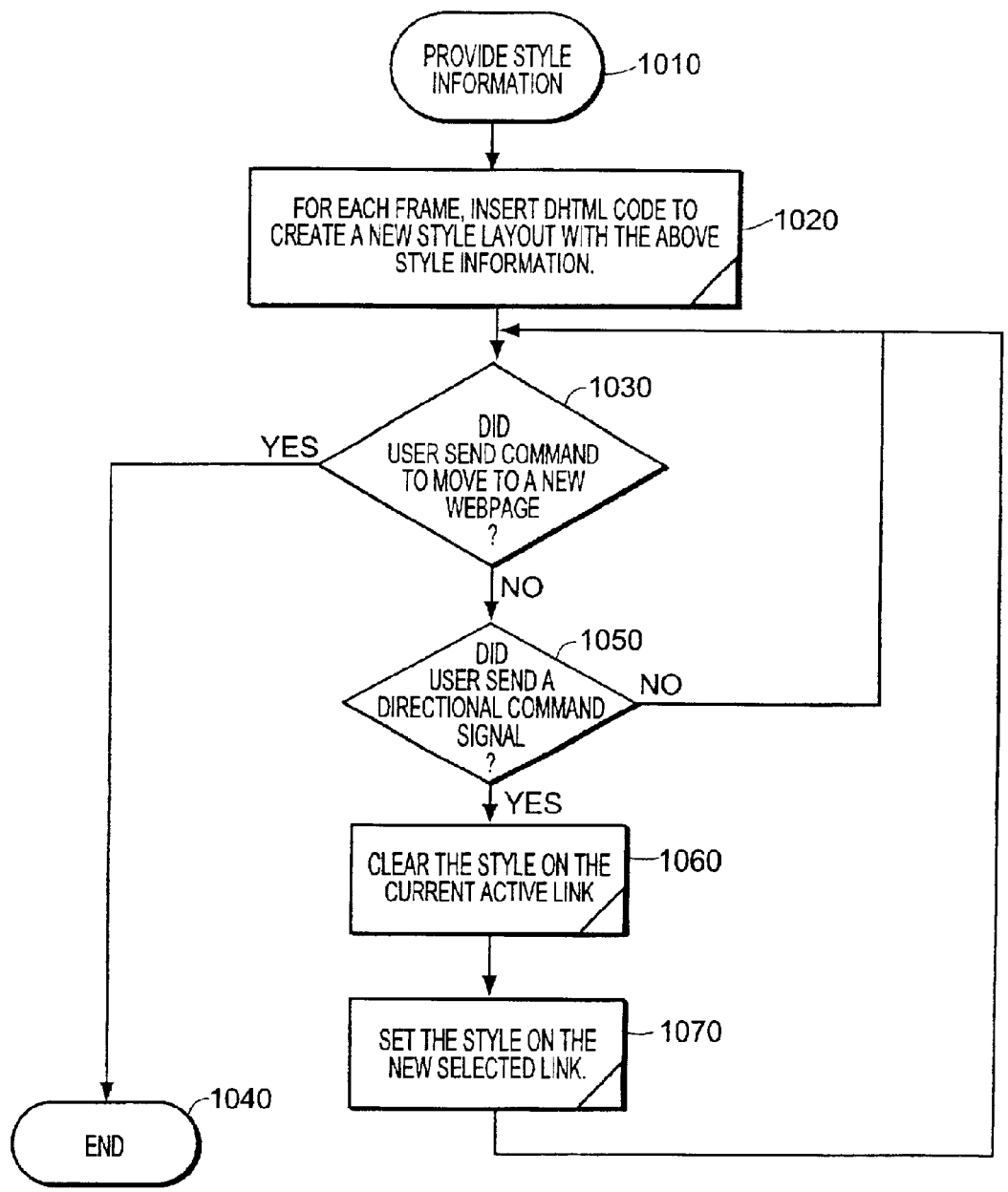
FIG. 10 is a flow diagram illustrating how to change the style of an active item.

When a link which is a hyperlink is made the active link as in step 550 of FIG. 5, the system uses the process of the flowchart of FIG. 10 to change the style of the link. The system first receives as input style information (Step 1010). Style information may include highlight effect information, such as size of the text to be highlighted, the color of the text to be highlighted and the font style of the text. For each frame that is currently part of the web page that is being displayed, the process adds DHTML code to create a cascading style sheet which incorporates the style information such that a new layer is formed (Step 1020). The process proceeds and checks for any user input signals. First the system checks to see if the user has sent a signal to receive a new web page (Step 1030). If the system confirms that a new web page has been requested, the process ends for the current web page and will be reinitialized for the new web page (Step 1040). If a new webpage is not selected, the system inquires as to whether a directional command signal has been received from a user's input device (Step 1050). If the answer is no and there is no directional command signal, the system continues and returns to step 1030. If the answer is yes that a user has sent a directional command signal for selecting a new active link, the system clears the style from the style layer on the current active link (Step 1060). The system also sets the style on the new selected link to indicate that it is the active link and does not parse the HTML code, but merely moves the style layer to the appropriate position of the active link (1070). The new active link is determined as previously described in FIGS. 5 and 5A. The process then takes the updated page and sends a displayable version of the updated page to the display device associated with the user who sent the directional command. The system then returns to step 1030 and awaits for the next input signal from the user's input device.

Figure 11:
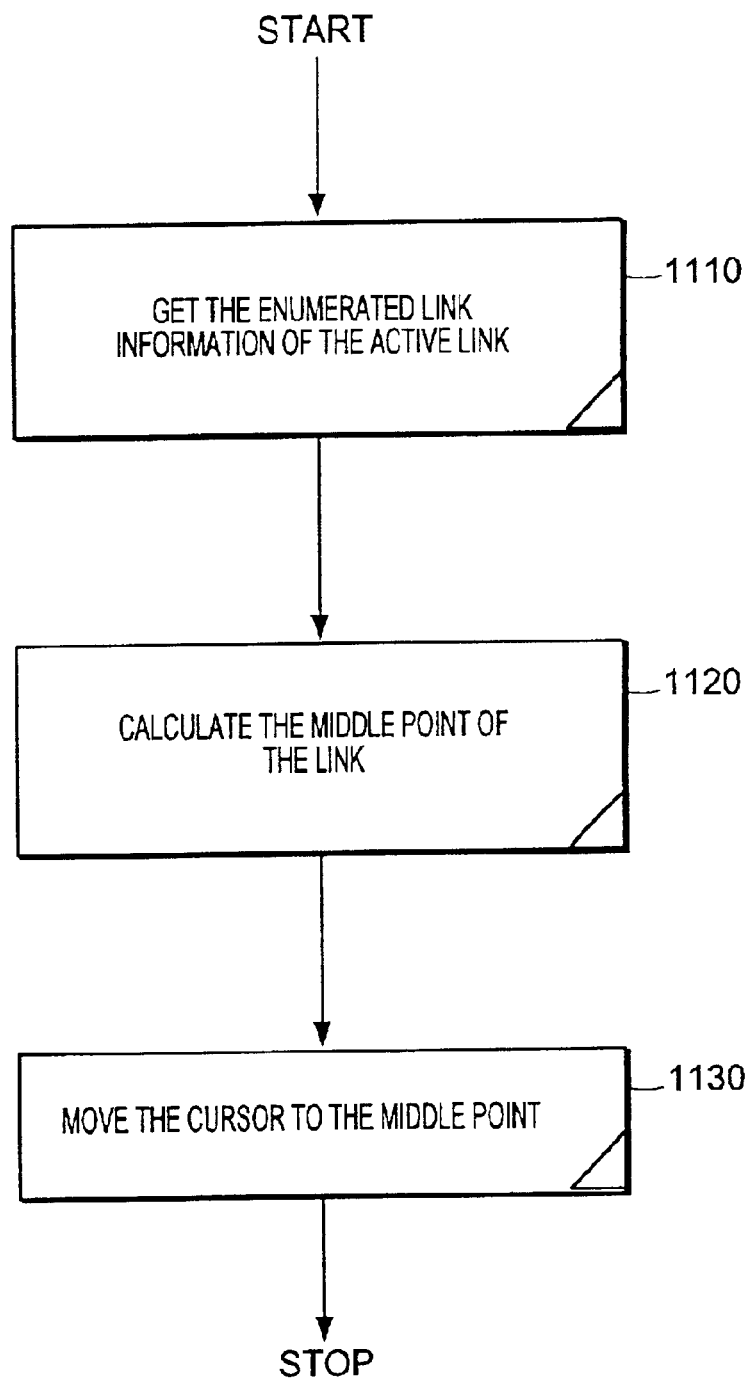
FIG. 11 is a flow diagram illustrating one embodiment of how to reposition a pointer, in accordance with the present invention.

When the active link is identified as in step 550 of FIG. 5, the system causes pointer to move to the active link as shown in the flow chart of FIG. 11. After a direction command is received and a link is determined to be the active link, the system gets the position information of the active link (Step 1110). The middle point of the link is determined based upon the position information (coordinates) (Step 1120). The pointer/cursor is then positioned at the middle point of the active link (Step 1130). The feature of instantly repositioning a pointer to each active hyperlink or frame by using the remote control or keyboard arrows is extremely beneficial in cable headend-based systems, since it helps eliminate any pointer movement latency effects that can be experienced in cable headend-based systems. Alternatively, a user can quickly and easily browse a Web page in a non-mouse environment.

The invention has been explained above with reference to a preferred embodiment. Other embodiments will be apparent to those skilled in the art in light of this disclosure. For example, the invention may be implemented in other configurations and/or used with other systems. Therefore, these and other variations upon the preferred embodiments are intended to be covered by the appended claims.

We claim:

1. A method for selecting a link as an active link in a proximate frame of web page having a plurality of frames knowing a first position within a frame, each frame having a location relative to a web browser window, the method:

determining the location within the web browser window of each frame;

receiving a directional command from an input device wherein the directional command is selected from a discrete set of directional commands;

determining the frame nearest the first position based upon the directional command;

selecting the nearest frame as the proximate frame;
enumerating all links within the proximate frame;
iteratively determining each navigable link within the proximate frame;
based upon the directional command selecting a navigable link based upon its position relative to the first position as the active link.

2. The method according to claim 1 wherein the input device is a directional keypad.

3. The method according to claim 1 wherein the input device is a remote control.

4. The method according to claim 3 wherein the remote control includes directional keys for user selection of a direction.

5. The method according to claim 1 wherein the method occurs in a cable television environment and wherein the method is performed on a server remote from a cable television set-top box.

6. The method according to claim 1 wherein the step of determining the nearest frame is performed iteratively.

7. The method according to claim 1, further comprising:
determining location boundaries for each frame relative to the web browser window.

8. The method according to claim 7 further comprising:
determining location of each link within the proximate frame relative to the web browser window.

9. The method according to claim 8, wherein:
selecting a navigable link is based upon the location of the first position relative to the browser window and the location of each link within the proximate frame relative to the web browser window.

10. The method according to claim 9 wherein the web browser window defines a coordinate system made up of columns and rows wherein columns are associated with up and down directional commands and rows are associated with left and right directional commands and wherein if a left or right directional command is received the navigable link that is selected has a location on a row that is associated with the location of the first position and wherein if an up or down directional command is received the navigable link that is selected has a location on a column that is associated with the first position.

11. The method according to claim 1, wherein the directional command is limited to one of: left, right, up or down.

12. The method according to claim 11, wherein if left or right direction is selected, iteratively searching to see if there is a link within a predetermined vertical increment in the direction of the directional command.

13. The method according to claim 1, wherein the web page is altered to indicate that the proximate frame is an active frame.

14. The method according to claim 1, wherein the web page is altered to visually indicate the active link.

15. A method for navigating between frames of a web page of a web document without using a movement translating pointing device, wherein a first position within a first frame relative to a coordinate system associated with a web browser window is known and is associated with a link, the method comprising:
determining a frame position relative to the coordinate system associated with the web browser window for each frame;
receiving a directional command signal selected from a discrete set of directional commands;
determining for each frame a distance between the frame position and the first position within the coordinate system; and
selecting the frame having the shortest distance from the first position based upon the directional command signal;
determining based on position a link within the frame having the shortest distance to the first position; and
selecting the determined link.

16. The method according to claim 15 wherein the non-movement translating pointing device is a directional keypad.

17. The method according to claim 15 wherein the non-movement translating pointing device is a remote control.

18. The method according to claim 17 wherein the remote control includes directional keys for user selection of a direction.

19. The method according to claim 15 wherein the method occurs in a cable television environment and wherein the method is performed on a server remote from a cable television set-top box.

20. The method according to claim 15, further comprising
determining the position of all links within the frame.

21. The method according to claim 20, further comprising:
determining all navigable links within the frame having the shortest distance.

22. The method according to claim 21, further comprising:
determining a navigable link which is closest to the first position based upon the directional command signal.

23. The method according to claim 22, further comprising: setting the closest navigable link as the active link.

24. The method according to claim 15, wherein a directional command associated with the directional command signal is limited to one of: left, right, up or down.

25. The method according to claim 24, wherein if left or right direction is selected, iteratively searching to see if there is a link within a predetermined vertical increment in the direction of the directional command signal within the frame having the shortest distance from the first position.

26. A method for navigating between a link in a first frame and a second frame of a displayed web page of a web document in a web browser window without using a movement translating pointing device, wherein the link of the first frame is active, the method comprising:
receiving a directional command from a discrete set of directional commands;
locating a nearest frame in the direction of the directional command which is the second frame;
determining if there are any navigable links within the second frame and
if the second frame does not contain navigable links, selecting the second frame based on the determined position making the second frame active.

27. A computer program product having computer code thereon for operation of a computer for selecting a link as an active link in a proximate frame on a web page having a plurality of frames knowing a first position within a frame, each frame having a location relative to a web browser window, the computer code on the computer program product comprising:
computer code for determining the location within the web browser window of each frame;
computer code for receiving a directional command from an input device wherein the directional command is issued by one of a discrete set of directional commands;
computer code for determining the frame nearest the first position based upon the directional command;
computer code for selecting the nearest frame as the proximate frame;
computer code for enumerating all links within the proximate frame;

computer code for determining each navigable link within the proximate frame;

computer code for selecting a navigable link within the proximate frame as the active link based upon its position relative to the first position and the directional command.

28. The computer program product according to claim 27, wherein the computer code for determining the nearest frame is performed iteratively.

29. The computer program product according to claim 27, further comprising:

computer code for determining location boundaries for each frame relative to the web browser.

30. The computer program product according to claim 27, further comprising: computer code for determining the position of all links within the proximate frame.

31. The computer program product according to claim 27, wherein the directional command is limited to one of: left, right, up or down.

32. The computer program product according to claim 31, further comprising:

computer code for iteratively searching to see if there is a link within a predetermined vertical increment in the selected direction from the first position within the proximate frame if left or right direction is selected.

33. The computer program product according to claim 27, further comprising: computer code for altering the web page when displayed to indicate that the proximate frame is an active frame.

34. A computer program product having computer code on a computer readable medium for operation of a computer for navigating between a link in a first frame and a second frame of a web page without using a movement translating pointing device, wherein the first frame is active, the computer program product comprising:

computer code for receiving a directional command from a discrete set of directional commands;

computer code for locating a nearest frame in the direction of the directional command which is the second frame;

computer code for determining if there are any navigable links within the second frame and computer code for selecting the second frame based on the determined position making the second frame active if the second frame does not contain navigable links.

35. A method for changing a selection of a link located within a first frame, the method comprising:

receiving a directional command from a discrete set of directional commands;

determining a proximate frame in the direction of the directional command;

determining a nearest link in the direction of the directional command within the proximate frame; and changing selection of the link in the first frame to the nearest link in the proximate frame.

36. The method according to claim 35, further comprising:

determining if there is a link in the direction of the directional command within the first frame; if there is no link within the first frame, determining a proximate frame.

37. A method for changing selection of an empty frame, the method comprising:

receiving a directional command from a discrete set of directional commands;

determining a proximate frame in the direction of the directional command;

determining a nearest link in the direction of the directional command within the proximate frame; and changing selection of the empty frame to the nearest link in the proximate frame.

38. A method for changing selection of a link located within a first frame, the method comprising:

receiving a directional command from a discrete set of directional commands;

determining a proximate frame in the direction of the directional command;

determining if a navigable link resides within the proximate frame; and if no navigable link resides within the proximate frame, then selecting the proximate frame as an empty frame.

39. A computer program product having computer code on a computer readable medium for changing a selection of a link located within a first frame, the computer program product comprising:

computer code for receiving a directional command from a discrete set of directional commands;

computer code for determining a proximate frame in the direction of the directional command;

computer code for determining a nearest link in the direction of the directional command within the proximate frame; and computer code for changing selection of the link in the first frame to the nearest link in the proximate frame.

40. The computer program product according to claim 39, further comprising:

computer code for determining if there is a link in the direction of the directional command within the first frame; if there is no link within the first frame, determining a proximate frame.

41. A computer program product having computer code on a computer readable medium for changing selection of an empty frame, the computer program product comprising:

computer code for receiving a directional command from a discrete set of directional commands;

computer code for determining a proximate frame in the direction of the directional command;

computer code for determining a nearest link in the direction of the directional command within the proximate frame; and computer code for changing selection of the empty frame to the nearest link in the proximate frame.

42. A computer program product having computer code on a computer readable medium for changing selection of a link located within a first frame, the computer program product comprising:

computer code for receiving a directional command from a discrete set of directional commands;

computer code for determining a proximate frame in the direction of the directional command;

computer code for determining if a navigable link resides within the proximate frame; and computer code for selecting the proximate frame as an empty frame if no navigable link resides within the proximate frame.

* * * * *